Fig. 1

INVENTOR.
John G. Vergobbi

Jan. 3, 1961  J. G. VERGOBBI  2,966,832
CONTAINER FORMING MACHINE
Filed Aug. 20, 1958  13 Sheets-Sheet 2

INVENTOR.
John G. Vergobbi
BY Robert H. Churchill
ATTORNEY

Jan. 3, 1961    J. G. VERGOBBI    2,966,832
CONTAINER FORMING MACHINE
Filed Aug. 20, 1958    13 Sheets-Sheet 3

INVENTOR.
John G. Vergobbi
BY Robert R. Churchill
ATTORNEY

Jan. 3, 1961 J. G. VERGOBBI 2,966,832
CONTAINER FORMING MACHINE
Filed Aug. 20, 1958 13 Sheets-Sheet 8

Fig. 11

INVENTOR.
John G. Vergobbi
BY Robert C. Churchill
ATTORNEY

INVENTOR.
John G. Vergobbi
BY Robert R. Churchill
ATTORNEY

Jan. 3, 1961  J. G. VERGOBBI  2,966,832
CONTAINER FORMING MACHINE
Filed Aug. 20, 1958  13 Sheets-Sheet 10

INVENTOR.
John G. Vergobbi
BY Robert R. Churchill
ATTORNEY

Jan. 3, 1961  J. G. VERGOBBI  2,966,832
CONTAINER FORMING MACHINE

Filed Aug. 20, 1958  13 Sheets-Sheet 11

INVENTOR.
John G. Vergobbi
BY
ATTORNEY

United States Patent Office 2,966,832
Patented Jan. 3, 1961

2,966,832
CONTAINER FORMING MACHINE

John G. Vergobbi, Quincy, Mass., assignor to Pneumatic Scale Corporation, Limited, Quincy, Mass., a corporation of Massachusetts Filed Aug. 20, 1958, Ser. No. 756,173

13 Claims. (Cl. 93—12)

This invention relates to a container forming machine.

The invention has for an object to provide a novel and improved container forming machine of the type provided with a forming block about which a blank of container forming material may be wrapped to form the container and in which novel provision is made for forming a fin type face-to-face side seam and a fin type face-to-face end closure in the container while disposed on the forming block in a novel, efficient and superior manner.

With this general object in view and such others as may hereinafter appear, the invention consists in the container forming machine and in the various structures, arrangements and combinations of parts hereinafter described and particularly defined in the claims at the end of this specification.

In the drawings illustrating the preferred embodiment of the invention.

In general the present invention contemplates a container forming machine having provision for producing a rectangular container or liner bag having a face-to-face longitudinal side seam and a face-to-face transverse end closure seam. The invention is herein illustrated as embodied in a container forming machine of the type adapted to form a composite container comprising an inner liner bag and an outer carton on a forming block and may comprise a machine of the general type illustrated and described in my United States Patent No. 2,533,642, issued December 12, 1950. Such prior container forming machines are provided with a plurality of forming blocks arranged to be intermittently moved to present the forming blocks successively to the various lining bag and carton forming stations of the machine. In the operation of such machines a lining blank is first folded about a forming block to form a tube, and at a succeeding station of operation portions of the lining blank extending beyond the end of the forming block are folded and sealed to form the bottom of the lining bag. At subsequent stations an outer blank or carton is wrapped about the liner bag on the block whereupon the composite liner and carton may be stripped from the forming block ready to be filled and top sealed. In accordance with the present invention novel mechanism is provided for forming a longitudinally extended face-to-face side seam in the liner bag at one station of operation and for forming a transverse face-to-face end closure seam at a subsequent station of operation.

Figure 1:
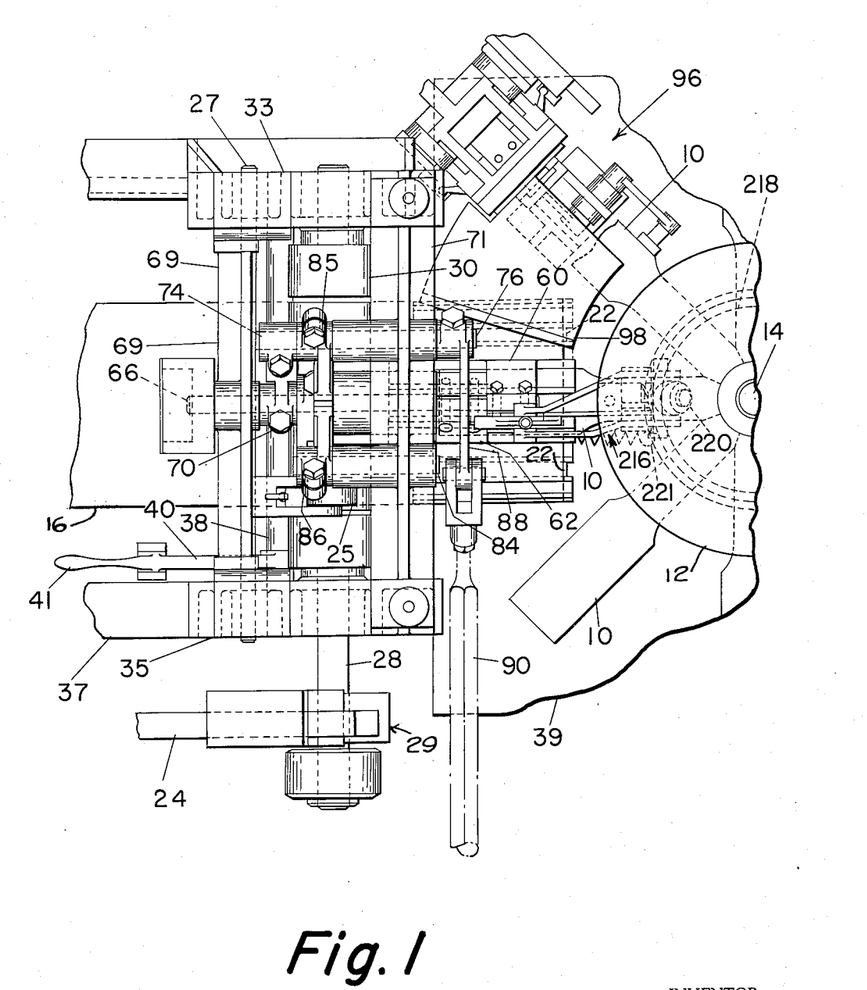
Fig. 1 is a plan view of a portion of a container forming machine embodying the present invention.
Figure 2:
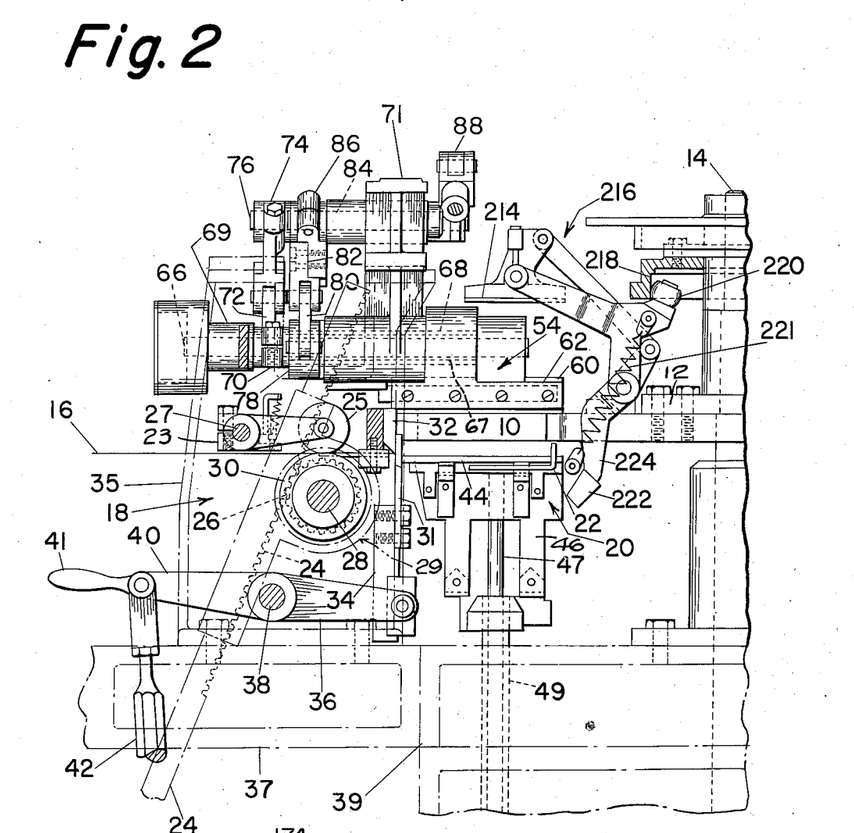
Fig. 2 is a side elevation of the mechanism shown in Fig. 1.

Referring now to the drawings and particularly to Figs. 1 and 2, 10 represents the forming blocks secured to a spider 12 mounted upon a central shaft 14 arranged to be intermittently rotated to present the forming blocks to successive stations in the formation of a composite liner and carton. Inasmuch as machines of this type, which are provided with mechanisms for wrapping first the liner about the forming block and for subsequently wrapping the outer carton thereabout, are well known in the packaging art only sufficient portions of the machine have been herein illustrated and will be hereinafter described as will enable the present invention to be understood.

In the operation of the machine the container forming material, which may comprise an elongated strip of heat sealable material 16, may be unwound from a roll thereof, not shown, and advanced by intermittently operated feeding mechanism indicated generally at 18 on top of supporting and folding elements indicated generally at 20 to present the leading edge of the strip against stop members 22 whereby to dispose the leading portion of the strip in operative position beneath a forming block 10. The intermittently operated feeding mechanism 18 may be of a known type wherein a reciprocable rack 24 in mesh with a gear 26 is operated to rotate shaft 28 upon which the feed roll 30 is mounted to advance a predetermined length of the strip each cycle of operation during the upstroke of the rack 24. As illustrated in Fig. 2, a plurality of cooperating pressure rollers 25 carried by arms 23 pivotally mounted at 27 may be resiliently urged toward the feed roller 30 to effect advancement of the strip. The gear 26 may form part of a known clutch mechanism indicated generally at 29 which is arranged to release the shaft 28 during the downstroke of the rack.

After the leading portion of the strip is positioned, as described, the strip may be severed by a vertically reciprocable knife blade 31 which cooperates with a stationary blade 32 secured to the machine frame. The blade 31 is attached to a block 34 carried by one arm 36 of a two-armed lever pivotally mounted at 38, the second arm 40 of the lever being connected by a link 42 to operating mechanism forming a part of the container forming machine and which is arranged to operate the blade 31 to sever the strip in timed relation to the operation of the feeding mechanism. The arm 40 may be provided with a handle 41 to permit manual operation. As shown in Fig. 1, the strip feeding and severing mechanisms may be supported between side frames 33, 35 supported on an extension 37 from the platen 39 of the machine frame.

Figure 4:
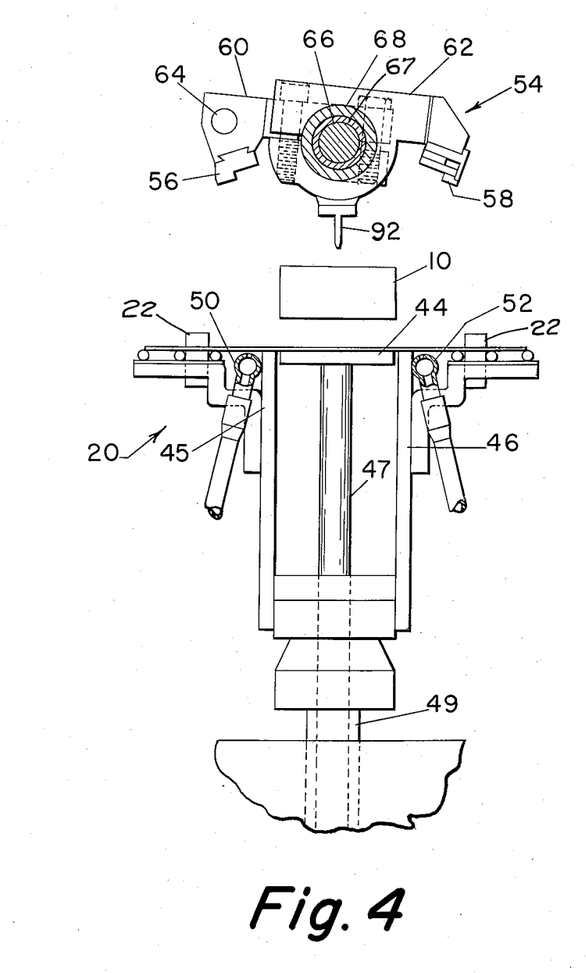
Figs. 4–8 are detail views of the container side seam forming and sealing mechanism showing the same in different positions of operation.
Figure 5:
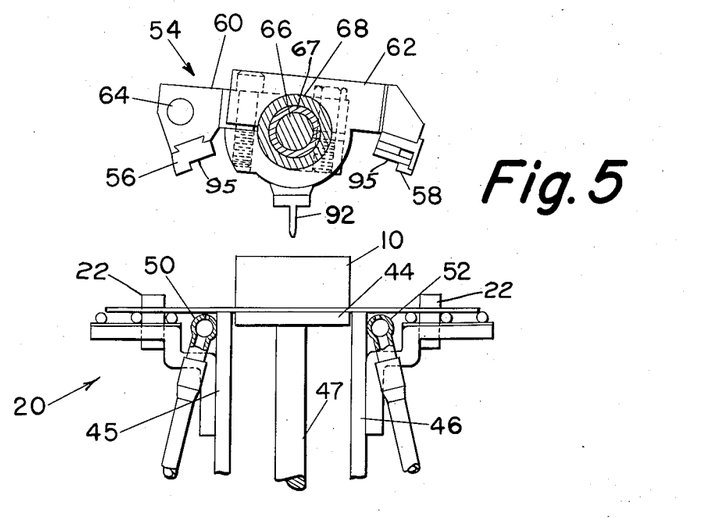
Figure 6:
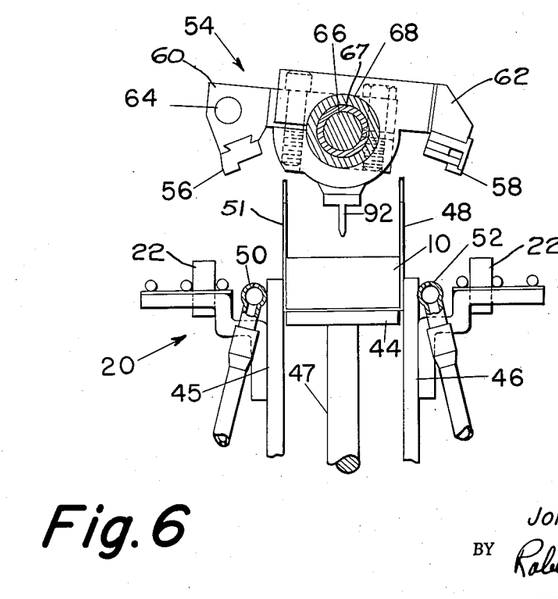

The rectangular blank thus severed from the strip is supported beneath the forming block 10 on top of the folding elements 20 which, as shown in Fig. 4, may comprise vertically reciprocable plates, including a bottom plate 44 and side plates 45, 46, together with laterally extended blank supporting portions carried thereby and which are arranged to be elevated to wrap the blank about the bottom and two sides of the block 10. As illustrated in Figs. 2 and 4, the bottom plate 44 may be secured to the upper end of a shaft 47 arranged to be reciprocated through cam operated mechanism, not shown, and forming a part of the container forming machine. The side plates 45, 46 are carried by a collar mounted at the upper end of a sleeve shaft 49 surrounding the shaft 47 and supported for reciprocation in the machine frame and may be similarly operated in a known manner. In practice the bottom plate 44 is elevated to present and retain the blank in firm engagement with the underside of the block as shown in Fig. 5 while the side plates 45, 46 continue upwardly to wrap the blank against the sides of the block, as shown in Fig. 6, leaving opposed portions 48, 51 of the blank extended upwardly beyond the top surface of the block. Air jets 50, 52, carried by the vertically reciprocal supporting elements 20, are arranged to direct streams of air against the extended portions 48, 51 to maintain the same in operative position to be engaged by the novel folding and sealing mechanism indicated generally at 54 to provide a longitudinally extended upstanding face-to-face side seam 55 in the manner indicated in Figs. 7 and 8.

Figure 3:
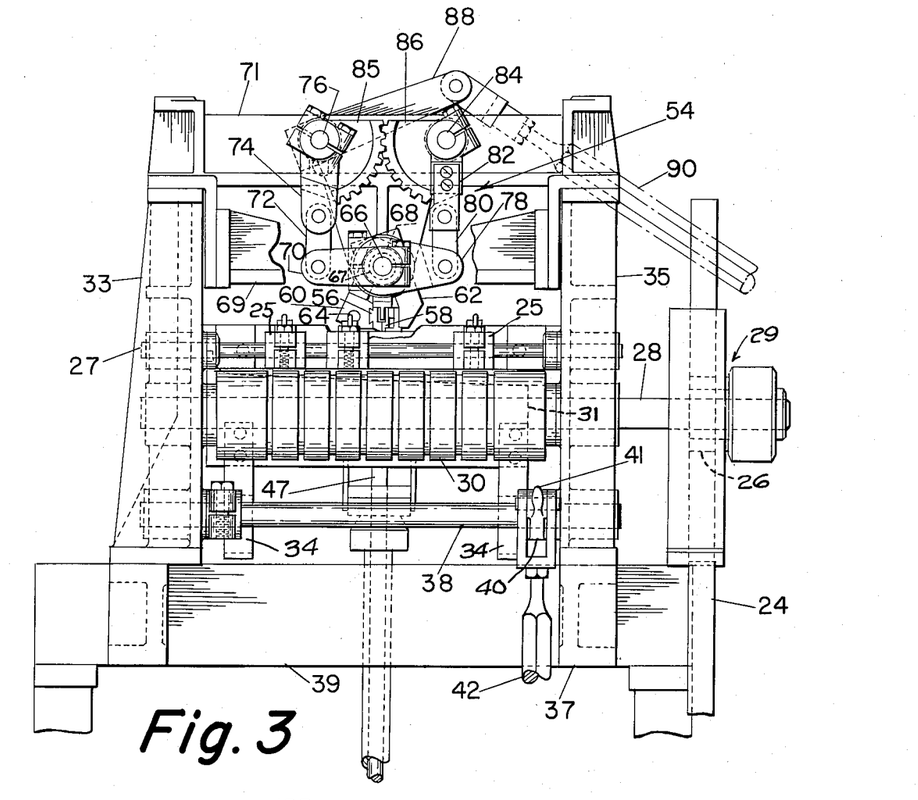
Fig. 3 is a front elevation of the container side seam forming and sealing mechanism shown in sealing position.
Figure 8:
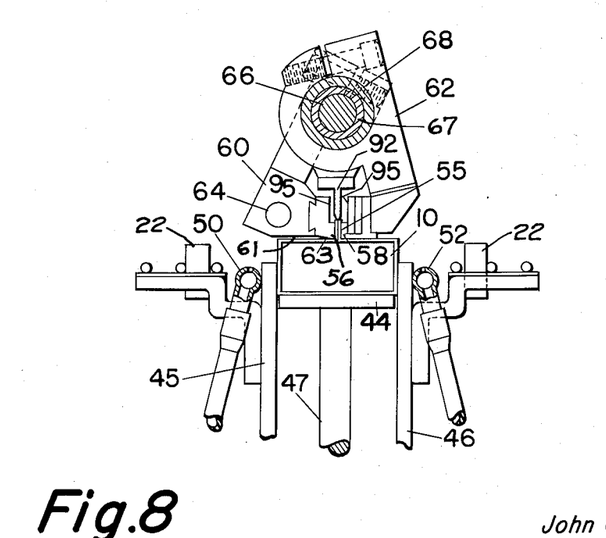

Referring now to Fig. 3, the novel side seam folding and sealing mechanism 54 for forming the face-to-face side seam 55 includes a pair of cooperating heat sealing jaws 56, 58 carried by arms 60, 62 mounted to be rocked from the outwardly spread position shown in Fig. 6 to the heat sealing position shown in Fig. 8. In practice both jaws 56, 58 may comprise metal, or the jaw 56 may comprise a metal member replaceably mounted in its supporting arm 60, as shown, and the jaw 58 may comprise rubber or like resilient material also replaceably mounted in its supporting arm 62. The supporting arm 60 may be provided with a heating element 64 for heating the metal jaw 56.

The arm 60 is fast on a central rocker shaft 66 which extends through an intermediate bushing 67 and a sleeve shaft 68 supported in bearings formed in tie pieces 69, 71 extended between the frame members 33, 35 of the machine frame, and an arm 70 also fast on the central shaft 66 is connected by a link 72 to an arm 74 fast on an upper rocker shaft 76. The arm 62 is fast on the sleeve shaft 68, and an arm 78 also fast on the sleeve shaft 68 is likewise connected by a link 80 to an arm 82 fast on a second upper rocker shaft 84. The shafts 76, 84 are connected by segmental gears 85, 86 secured to the rocker shafts 76, 84 respectively. The shaft 76 is further provided with an arm 88 fast thereon which is connected by a link 90 to cam operated mechanism, not shown, and which forms a part of the container forming machine.

Figure 7:
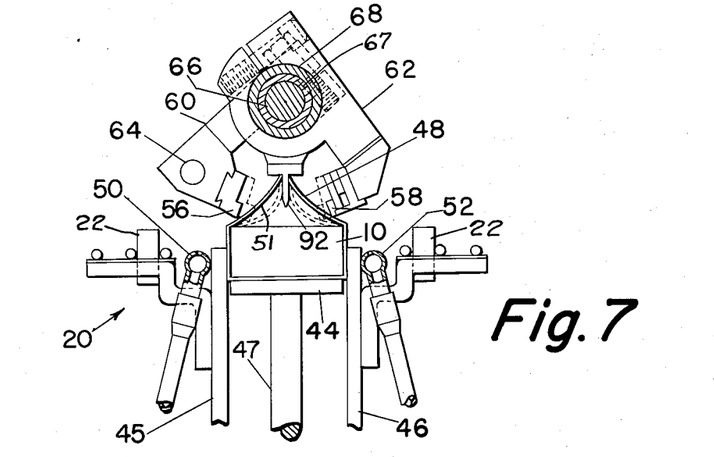

In operation the extended portions 48, 51 of the container forming blank are maintained in an upstanding or inwardly directed position by the air jets 50, 52, as shown in Fig. 6, and the sealing jaws 56, 58 are rocked inwardly though the linkage described to engage and fold the extended portions 48, 51 against the upper surface of the forming block 10. In order to cause the marginal edges of the extended portions to assume an upstanding face-to-face position during the inward rocking movement of the sealing jaws a central, relatively thin and longitudinally extended bar 92 is supported above the forming block 10 from the underside of the supporting brackets 69, 71. The bar 92 extends parallel to the upper surface of the block with its major axis at right angles thereto and, as illustrated in Fig. 7, as the jaws 56, 58 move inwardly the marginal edges of the extensions 48, 51 engage the central bar 92 which serves as a guide to maintain the marginal edges separated so as to prevent overlapping of the same. During continued inward movement of the sealing jaws the ends of the marginal edges pass beyond the bottom edge of the guide bar 92 and are brought together in face-to-face relation. The lower edge of the bar 92 is spaced above the forming block a distance such as to provide sufficient clearance for the operative portions of the sealing jaws to engage the upstanding face-to-face marginal portions of the liner blank as shown in Fig. 8. As herein shown, the upper portions of the jaws 56, 58 are cut out as indicated at 95 to provide a clearance space for the bar 92 supported above the block. The jaws thus brought together to fold the upstanding portions 48, 51 of the container material over the top surface of the block and in cooperation with the bar 92 to form the upstanding side seam indicated at 55 are brought together with substantial pressure to effect activation of the material and heat sealing of the upstanding seam.

As best shown in Fig. 8, the jaw supporting arm 60 is relieved on its underside, as indicated at 61, to avoid engagement with the upper surface of the forming block and the container forming material, and the underside of the heat sealing jaw 56 carried thereby is defined by an angular line 63 extending downwardly from the lower edge of the arm 60, spaced from the upper surface of the block, to a point closely adjacent the lower edge of the sealing face of the jaw so that during the sealing operation a minimum of the surface area of the heated underside of the sealing jaw is disposed in close proximity to the heat sealable container material on the block, and activation of the material and its subsequent adherence to the forming block is thereby substantially eliminated.

Figures 9, 10:
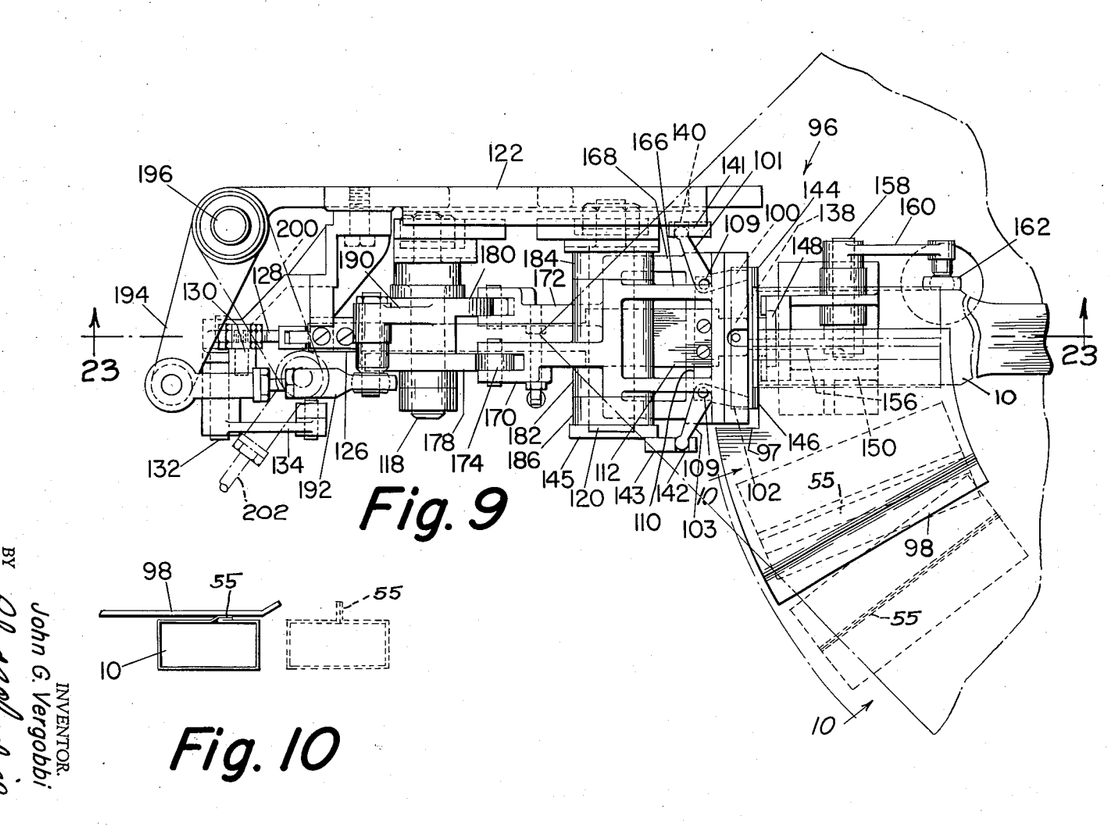
Fig. 9 is a plan view of the mechanism for forming a transverse face-to-face end closure in the container.
Fig. 10 is an end view detail of the forming block showing the side seam folded flat against the block as seen from the line 10—10 of Fig. 9.
Figure 16:
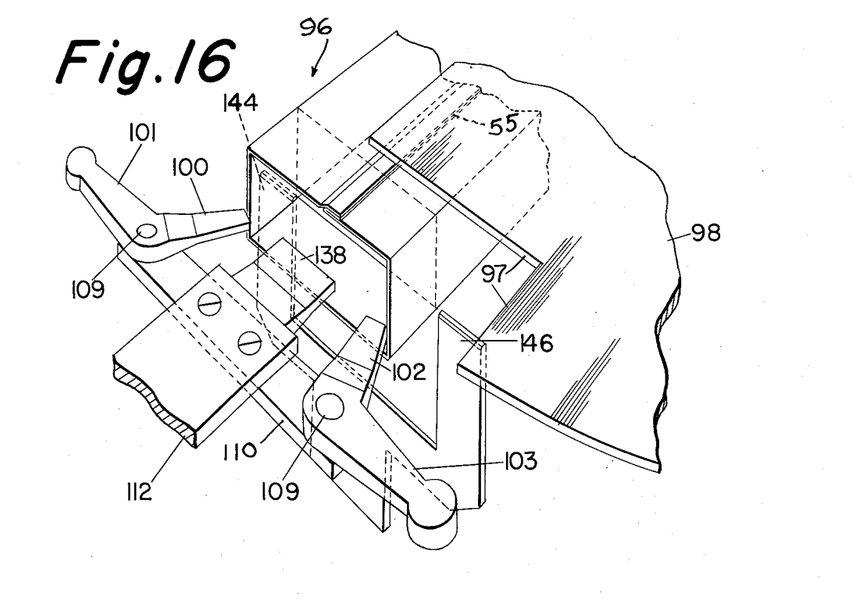
Figs. 16, 17 and 18 are perspective views illustrating successive steps in the formation of the end closure.

It may be seen that in wrapping the blank about the forming block, portions of the blank extend beyond the outer end of the block for forming the end or bottom closure at a subsequent station of operation, and it will also be observed that the sealing jaws are of sufficient length so as to provide a heat sealed side seam 55 extending the full length of the container including the portions which extend beyond the end of the block. The material thus wrapped about the block and provided with a side seam forms a tube having one end of the tube extended beyond the end of the block. In the continued operation of the machine the vertically reciprocable folding elements 44, 45, 46 are returned to their lowered position, and the jaws 56, 58 are returned to their initial position as shown in Fig. 4. The forming block 10 is then intermittently moved to the next station of operation and, as illustrated in Figs. 1 and 9, during its movement from the side seam forming station to the bottom closure forming station indicate generally at 96 the forming block passes under a stationary folding plate 98 which operates to fold down the upstanding side seam as shown in Fig. 10. As indicated in Fig. 16, the folding plate 98 is extended to the end closure forming station 96 to maintain the seam 55 in its folded down position during the end closure forming operation. The plate 98 may be cut out as indicated at 97 to provide clearance for the end wall spreading operation.

Figure 11:
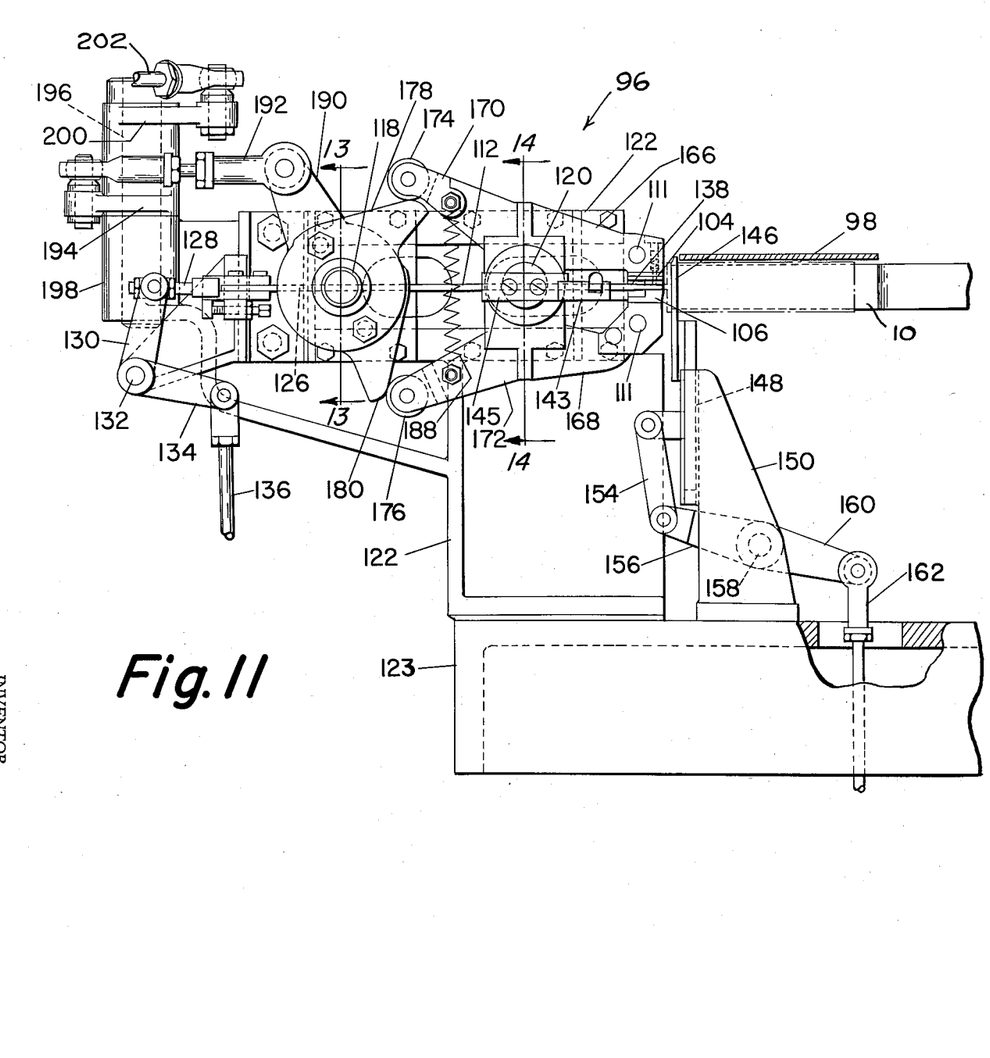
Fig. 11 is a side elevation of the end closure forming and sealing mechanism shown in Fig. 9.

Referring now to Figs. 9 and 11, the end or bottom closure forming and sealing apparatus 96 comprises mechanism including a pair of spreader fingers 100, 102 for spreading the end walls of the extended portion outwardly to bring the opposed side walls of the extended portions together to form a transverse elongated fold. The end closure sealing apparatus further comprises mechanism including a pair of end closure folding and pressure applying heat sealing jaws 104, 106 for forming the transverse seam 108 in the end closure. The spreader fingers 100, 102 comprise bell cranks pivotally mounted at 109 on the ends of a cross bar 110 carried by and movable with a reciprocable slide member 112. The slide member 112 is supported for reciprocable movement in slotted openings provided in stationary supporting studs 118, 120 carried by and extended from a frame member 122 mounted on the platen 123 of the machine frame, see Fig. 11. The slide member 112 is provided with an extension 126 connected by a link 128 to an arm 130 fast on a rocker shaft 132. A second arm 134 fast on shaft 132 is connected by a link 136 to cam operated mechanism, not shown, forming in part of the container forming machine.

Figure 17:
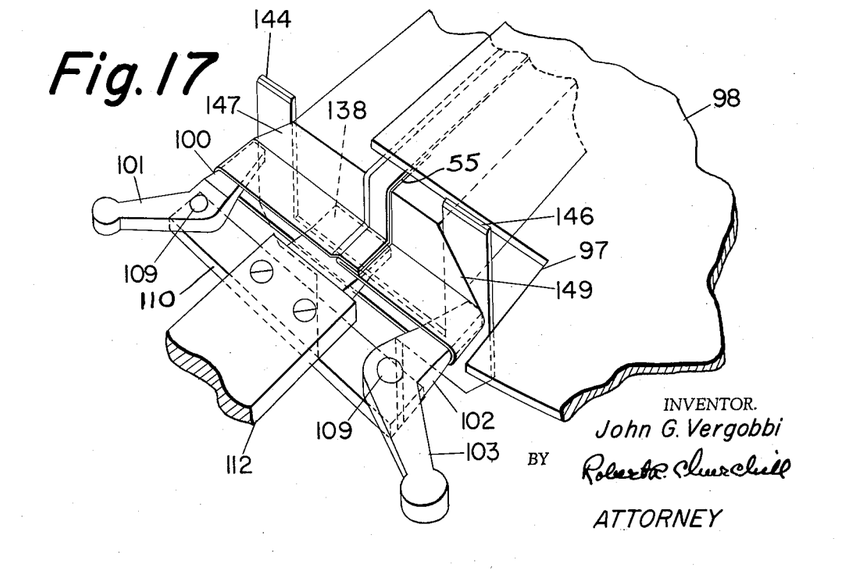

The forward end of the slide member 112 forms a tongue 138 which is extended between the side walls of the extended portions of the container during the forward stroke of the slide mechanism. The spreader fingers 100, 102, each forming one arm of the pivotally mounted bell cranks carried by the slide member 112, also enter between the side walls of the extended portion, the second arms 101, 103 of the bell cranks having cylindrical end portions arranged to cooperate with cam slots 140, 142 formed in stationary blocks 141, 143 respectively. The block 141 is supported from the frame member 122, and the block 143 is secured to a lateral extension 145 attached to the outer end of the stud 120. Thus, in operation during the continued forward movement of the slide member 112 the fingers 100, 102 are rocked outwardly, as shown in Fig. 17, to spread the end walls outwardly and to bring the side walls of the closure together as shown. It will be observed that the spreading operation forms triangular end portions 147, 149 extended laterally from the end walls of the forming block.

Figure 12:
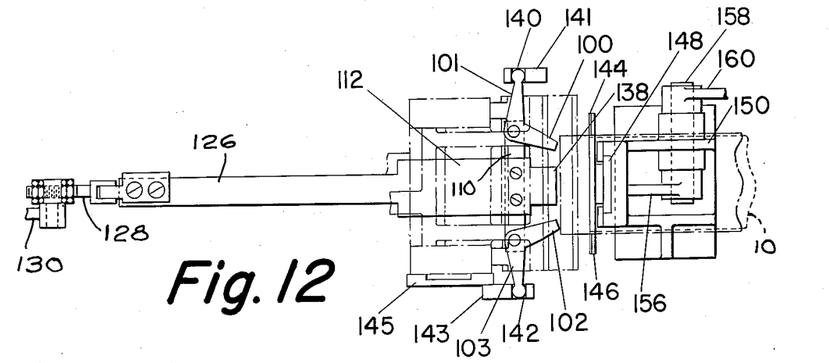
Fig. 12 is a plan view detail of a portion of the end closure forming mechanism shown in Fig. 9 and showing the parts in a different position of operation.
Figure 18:
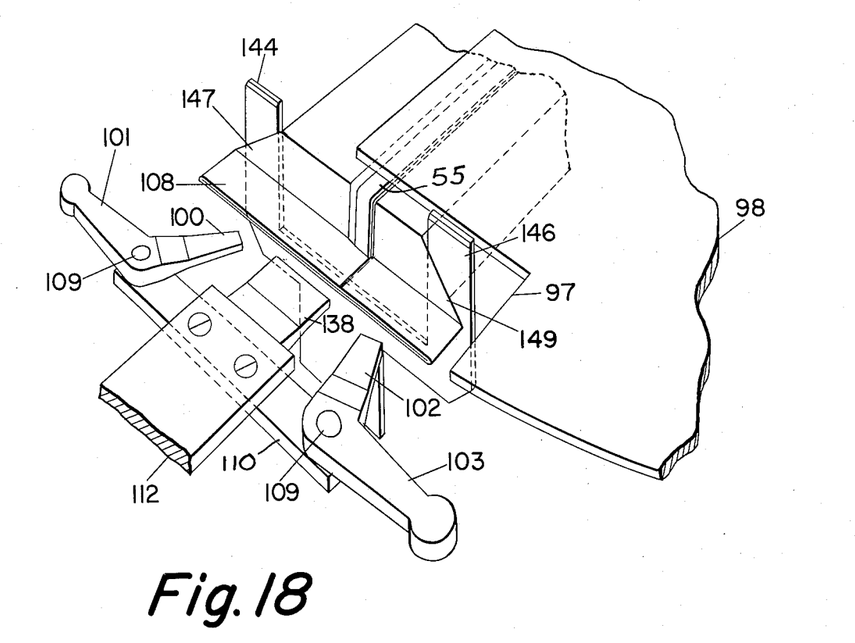

As illustrated in Fig. 11, prior to the spreading operation, as above described, a vertically reciprocable supporting plate having spaced arms 144, 146 is arranged to be elevated to present the arms in straddling relation to the end of the forming block and in flush alignment therewith to provide supports against which the laterally extended triangular portions are formed during the spreading operation. The supporting plate, as shown in Fig. 11, is carried by a slide member 148 mounted in a bracket 150, secured to the platen 123 of the machine frame. The slide member 148 is provided with a lateral extension or hub connected by a link 154 to an arm 156 fast on a rocker shaft 158. A second arm 160 also fast on the shaft 158 is connected by an operating link 162 to cam operated mechanism, not shown, forming a part of the container forming machine. During the spreading operation the sealing jaws 104, 106 are operated in timed relation to the spreader fingers to fold the extended side wall portions inwardly, the tongue portion 138 and the spreader fingers remaining between the side walls to maintain the elongated fold until the jaws arrive at the slightly spaced position as shown in Fig. 11 whereupon the tongue and spreader fingers are fully withdrawn to the position shown in Fig. 12 immediately prior to complete closing of the jaws 104, 106 to apply heat and pressure to form the transverse seam 108 illustrated in Figs. 18 and 19. The provision of the tongue 138 between the side walls assists in maintaining the same in a smoothed-out condition preparatory to being sealed. In practice the sealing jaws may comprise metal, and each jaw may be provided with heating elements indicated generally at 111, or one jaw may comprise metal and the opposing jaw may comprise rubber or like resilient facing material, the heating element being eliminated in the rubber faced jaw. Each jaw may also be replaceably mounted in its respective holding arm 166, 168.

Figure 13:
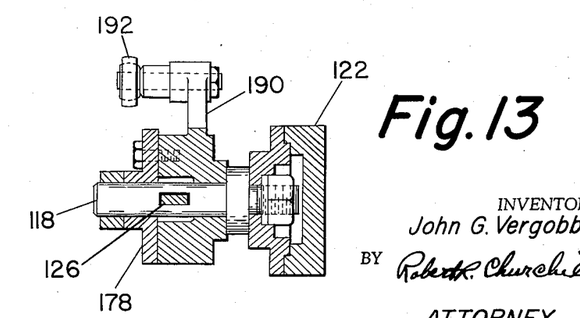
Fig. 13 is a vertical cross section taken on the line 13—13 of Fig. 11.
Figure 14:
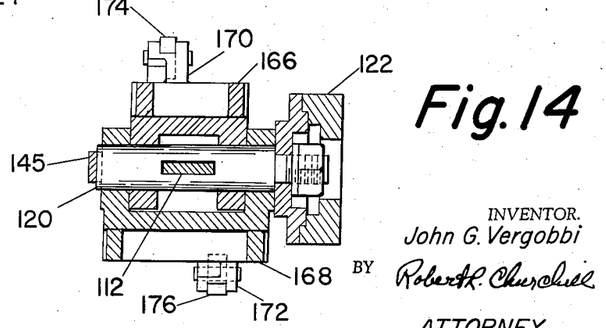
Fig. 14 is a vertical cross section taken on the line 14—14 of Fig. 11.
Figure 15:
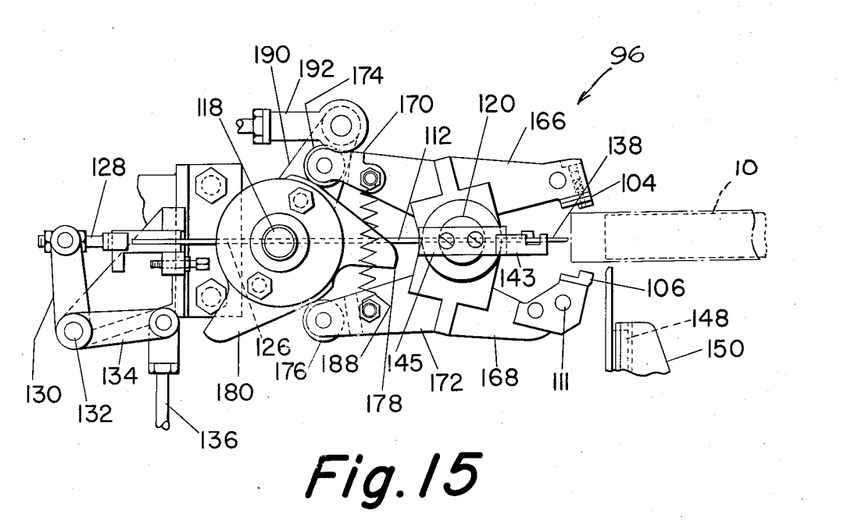
Fig. 15 is a view similar to Fig. 11 showing the parts in a different position of operation.
Figure 23:
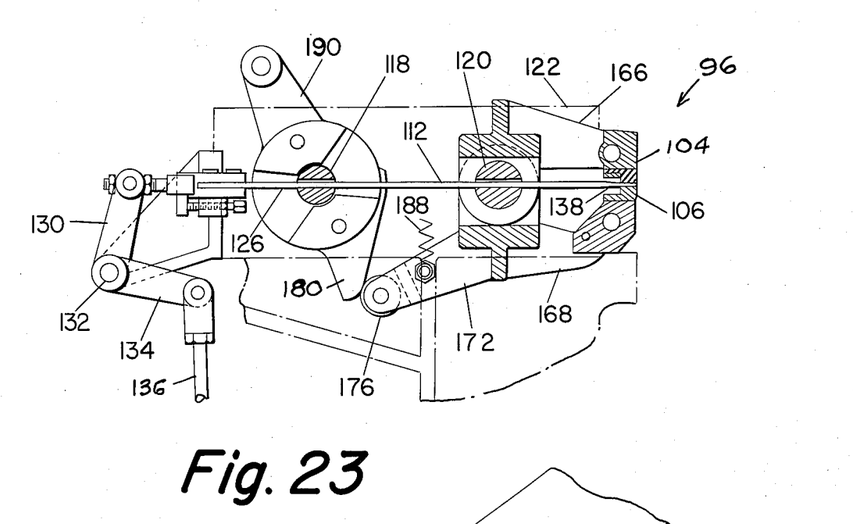
Fig. 23 is a cross sectional view taken on the line 23—23 of Fig. 9.

As illustrated in Figs. 9 and 11, the sealing jaws 104, 106 are carried by opposed arms 166, 168 mounted to rock on the central stud 120, extensions 170, 172 of the arms 166, 168 respectively being provided with cam rolls 174, 176 for cooperation with rocker cams 178, 180 mounted on the stud 118. As shown in Fig. 9, the central hub portion 182 of the arm 166 is straddled by the yoked hub portions 184, 186 of the opposing arm 168, and the central hub portion 182 may be cut out to provide clearance for the slide member 112 extended through the slotted portion of the stud 120 as illustrated in Figs. 14 and 23. The cams 178, 180 may be connected to operate in unison, provision being made for adjusting the cams relative to each other on the stud to obtain the sealing pressure required. A coil spring 188 connected between the extensions 170, 172 serves to effect separation of the jaws. The hubs of the cam portions 178, 180 may also be cut out to provide clearance for the narrower portion 126 of the slide member 112 extended through the slotted portion of the stud 118 as shown in Figs. 13 and 23. The cam portion 180 is provided with an arm 190 connected by a link 192 to an arm 194 fast on the upper end of a vertical shaft 196 supported in a bearing 198 attached to the frame member 122. A second arm 200 formed on the same hub as the arm 194 may be connected by a link 202 to cam operated mechanism, not shown, forming a part of the container forming machine.

From the above description it will be seen that the novel apparatus thus far described is arranged to provide a face-to-face longitudinally extended heat sealed side seam 55 in a container blank wrapped about a forming block to form a tube at one station of operation, and is also arranged to provide a transversely extended face-to-face end or bottom closure seam 108 for the container at a second station of operation while the container is supported on the forming block.

Figure 19:
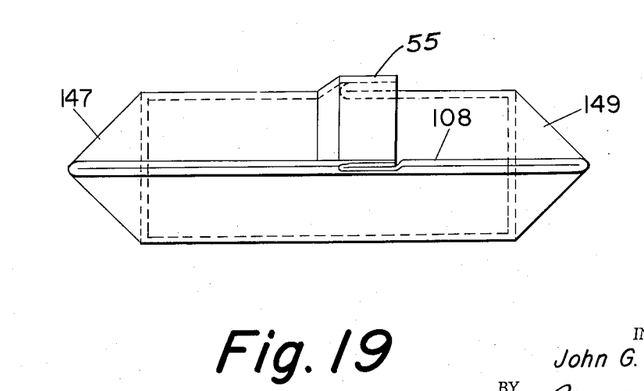
Fig. 19 is a plan view showing the end closure produced by the mechanism shown in Fig. 9.

It will be observed that the horizontally extended forming block 10, rectangular in cross section, is preferably arranged with its longer axis or wider side extended horizontally so that the side seam 55 occurs in a wide side wall of the container substantially medially thereof rather than in one of the narrower end walls. This structure is of advantage for the reason that when the spreader fingers 100, 102 are operated to spread the end walls outwardly to form the elongated fold at the second station of operation the side seam does not interfere with the elongation of the fold and the formation of the triangular portions so that a neater and more uniform transverse seam and end fold is provided. Also, the provision of the side seam 55 in the wider side wall of the container permits the portion of the side seam occurring in the transverse seam 108 to be compressed and sealed with the opposed side walls, as shown in Fig. 19, to provide a tight and substantially leakproof transverse seam.

Figure 20:
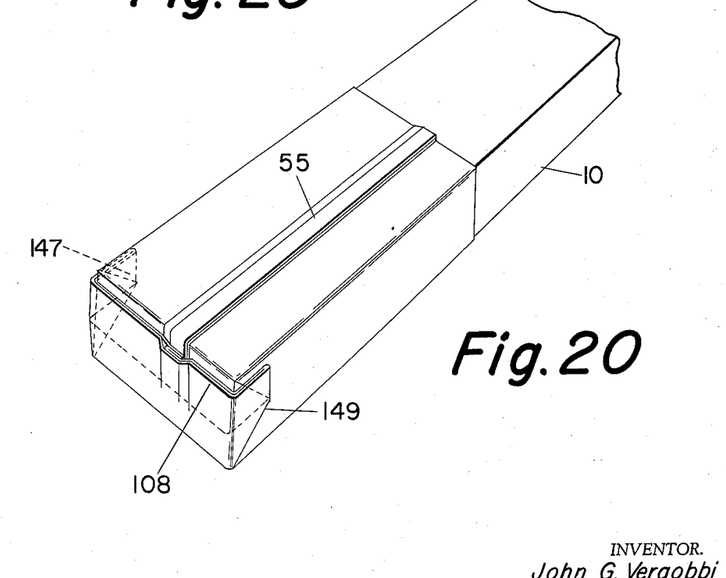
Figs. 20, 21 and 22 are perspective detail views illustrating the various steps performed in completing the lined container in the present container forming machine.
Figures 21, 22:
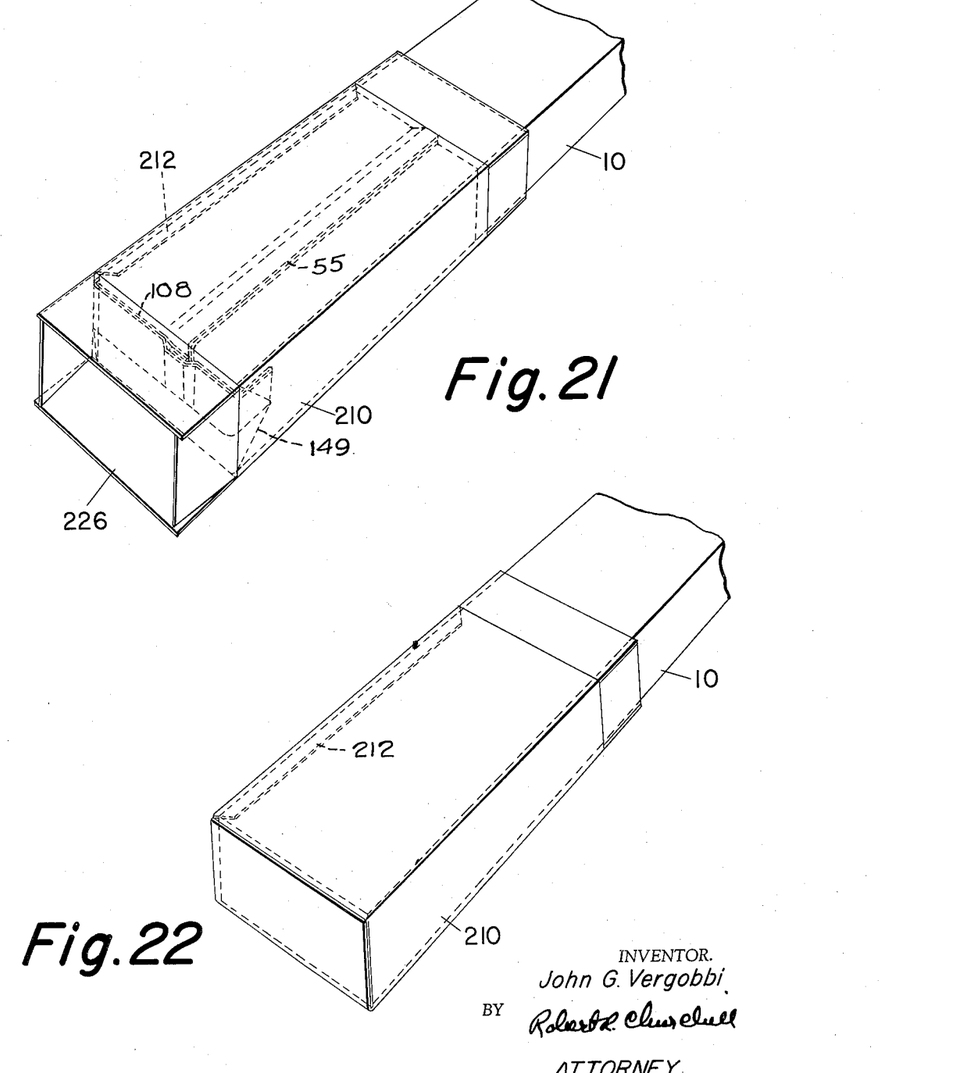

In the continued operation of the container forming machine, the upstanding transverse end closure seam 108 is folded flat against the end of the forming block, and the laterally extended triangular end portions 147, 149 are folded back parallel to the end walls of the container, as shown in Fig. 20, by known mechanism. Thereafter a carton blank 210 is wrapped about the liner bag thus formed on the block 10, as shown in Fig. 21, which serves to hold the folded portions of the liner bag in their folded condition. The carton blank is preferably provided with a conventional adhesively sealed overlapping side seam 212 adjacent one edge of the upper surface of the carton. Provision is made for holding and pressing the carton side seam 212 to set the adhesive, the side seam presser being indicated at 214 in Fig. 2 in its upraised position. The presser 214 supported by parallel linkage indicated at 216 is carried by and movable with the spider 12, a presser being provided for each forming block. A stationary cam 218 cooperating with a roller 220 maintains the presser in its upraised position at the lining bag forming stations, and the presser is rocked into engagement with the overlapping carton side seam at the carton applying station by a spring 221. Substantial pressure may be applied by a second stationary cam, not shown, arranged to cooperate with a roller 222 carried by an arm 224 forming a part of the seam presser linkage.

The carton blank may be provided with the usual bottom closing flaps 226 which may be folded down and adhesively secured together in a conventional manner as shown in Fig. 22. At subsequent stations of the container forming machine provision is made for applying pressure to the bottom closure and to the side seam to set the adhesive, and for thereafter stripping the completed lined carton from the forming block in a known manner.

Another important advantage of the present container forming machine resides in the structure wherein heat sealed side and end closure seams may be formed in the heat and pressure sealable bag forming material wrapped about a cold or unheated forming block. Prior machines having provision for forming heat sealed seams wherein overlapping portions of the heat sealable material were pressed into heat sealing engagement against a heated block were likely to cause difficulty because of adhesive spreading beyond the seams to effect adherence of the lining bag to the forming block, thus rendering it difficult to remove the container from the forming block at the stripping station. The present expedient of providing fin type face-to-face heat sealed seams on an unheated forming block not only produces more efficient closure seams but also eliminates any likelihood of spreading adhesive onto the forming block. Any usual or preferred type of thermoplastic heat sealable adhesive or pressure sensitive adhesive may be used, including the so-called "hot-melt adhesives" which may be applied to the marginal edges to be heat sealed.

While the preferred embodiment of the invention has been herein illustrated and described, it will be understood that the invention may be embodied in other forms within the scope of the following claims.

Having thus described the invention, what is claimed is:

1. In a container forming machine of the character described, in combination, a forming block about which a blank of lining material may be wrapped to form a lining bag, means for folding the blank about three sides of the block leaving extended marginal portions, means for folding the extended marginal portions into engagement with the remaining side of the block, stationary means cooperating with said folding means for guiding said extensions during the folding operation to present the marginal edges thereof into face-to-face relation and projecting from the block, said folding means including longitudinal seam forming elements cooperating to apply pressure to said marginal edges to provide an outwardly projecting longitudinal side seam, thus forming a tube about the block having portions extended beyond the end of the block, means for folding the projecting side seam down flat against the block, means for thereafter folding the portions of the tube extended beyond the end of the block to form an elongated face-to-face transverse end closure, and means including transverse seam forming elements cooperating to apply pressure to said end closure to form a transverse seam whereby to provide a lining bag open at one end adapted to be removed from the forming block.

2. A container forming machine as defined in claim 1 wherein the lining material comprises a heat sealable material, and wherein the longitudinal and transverse seam forming elements are arranged to apply heat and pressure to seal said seams.

3. A container forming machine as defining in claim 1 wherein the longitudinal seam forming elements are arranged to seal the side seam the full length of the tube including the portion extending beyond the end of the block.

4. A container forming machine as defined in claim 1 wherein the forming block is rectangular in cross section having relatively wide side walls and relatively narrow end walls, said longitudinal side seam occurring in about a medial portion of a wider side wall of the tube formed on the block.

5. A container forming machine as defined in claim 1 wherein the forming block is intermittently moved to successive operating stations, the longitudinal seam forming means being disposed at one station of operation and the transverse seam forming means being disposed at a succeeding station of operation, and wherein the means for folding down the projecting side seam comprises a stationary plate disposed between said stations to effect the folding operation during movement of the block between the stations.

6. In a container forming machine of the character described, in combination, a forming block about which a blank of lining material may be wrapped to form a lining bag, means for folding the blank about three sides of the block leaving extended marginal portions, means for folding the extended marginal portions into engagement with the remaining side of the block, stationary means for guiding said extensions during the folding operation comprising a relatively narrow longitudinally extended bar arranged at right angles to and spaced from and disposed about medially of said remaining side of the block, said stationary bar cooperating with the folding means to cause the marginal edges of said extensions to assume a face-to-face relation projecting from the block, said folding means including a pair of pivotally mounted arms having opposed sealing jaws mounted therein and cooperating to apply pressure to said marginal edges to provide a longitudinally extended projecting side seam, thus forming a tube about the block having portions extended beyond the end of the block, means for folding the projecting side seam down flat against the block, means for thereafter folding the portions of the tube extended beyond the end of the block to form a transverse elongated face-to-face end closure, and means for applying pressure to said face-to-face end closure to form a transverse seam whereby to provide a lining bag open at one end adapted to be removed from the forming block.

7. In a container forming machine of the character described, in combination, a forming block about which a blank of lining material may be wrapped to form a lining bag, means for folding the blank about three sides of the block leaving extended marginal portions, means for folding the extended marginal portions into engagement with the remaining side of the block, stationary means cooperating with said folding means for guiding said extensions during the folding operation to present the marginal edges thereof into face-to-face relation and projecting from the block, said folding means including longitudinal seam forming elements cooperating to apply pressure to said marginal edges to provide an outwardly projecting longitudinal side seam, thus forming a tube about the block having portions extended beyond the end of the block, means for folding the projecting side seam down flat against the block, means for thereafter folding the portions of the tube extended beyond the end of the block to form an elongated face-to-face transverse end closure, said elongated end closure forming means including a pair of pivotally mounted spreader fingers movable into the open end of the tube and arranged to be rocked to spread the opposed end walls of the same outwardly, a pair of rockingly mounted sealing jaws cooperating with the spreader fingers and engageable with opposed side walls to fold them inwardly during the spreading operation, said sealing jaws applying pressure to the closure to seal the same upon withdrawal of the spreader fingers whereby to provide a lining bag open at one end adapted to be removed from the forming block.

8. In a container forming machine of the character described, in combination, a forming block about which a blank of lining material may be wrapped to form a lining bag, means for folding the blank about three sides of the block leaving extended marginal portions, means for folding the extended marginal portions into engagement with the remaining side of the block, stationary means cooperating with said folding means for guiding said extensions during the folding operation to present the marginal edges thereof into face-to-face relation and projecting from the block, said folding means including cooperating seam forming elements for applying pressure to said marginal edges to provide an outwardly projecting longitudinal side seam.

9. A container forming machine as defined in claim 8 wherein the lining blank comprises a heat sealable material, and wherein the seam forming elements are arranged to apply heat and pressure to seal said seam.

10. A container forming machine as defined in claim 8 wherein the longitudinally extended side seam occurs about medially of said remaining side of the block.

11. In a container forming machine of the character described, in combination, a forming block about which a blank of lining material may be wrapped to form a lining bag, means for folding the blank about three sides of the block leaving extended marginal portions, means for folding the extended marginal portions into engagement with the remaining side of the block, stationary means for guiding said extensions during the folding operation comprising a relatively narrow longitudinally extended bar arranged at right angles to and spaced from and disposed about medially of said remaining side of the block, said stationary bar cooperating with the folding means to cause the marginal edges of said extensions to assume a face-to-face relation projecting from the block, said folding means including a pair of pivotally mounted arms having opposed sealing jaws mounted therein and cooperating to apply pressure to said marginal edges to provide a longitudinally extended projecting side seam.

12. A container forming machine as defined in claim 11 wherein the lining blank comprises heat sealable material and wherein the sealing jaws are arranged to apply heat and pressure to seal said projecting side seam, at least one of said jaws being heated, said one jaw having the surface nearest the forming block relieved to present a minimum surface area of the heated jaw adjacent the block during the side seam sealing operation.

13. In a container forming machine of the character described, in combination, a forming block about which a blank of heat sealable lining material is wrapped to form a tube having portions extended beyond the end of the forming block, end closure forming means including a pair of pivotally mounted spreader fingers movable into the open end of the tube and arranged to be rocked to spread the opposed end walls of the same outwardly, an intermediate tongue member also movable into the open end of the tube, and a pair of rockingly mounted sealing jaws at least one of which is heated cooperating with the spreader fingers and said tongue member and engageable with opposed side walls to fold them inwardly during the spreading operation, said spreader fingers and said tongue member remaining between the side walls until the jaws arrive in slightly spaced relation thereto whereby to effect preliminary smoothing and shaping of the end closure preparatory to forming the seal, said sealing jaws thereafter applying pressure to the closure to seal the same upon withdrawal of the spreader fingers and said tongue member.

References Cited in the file of this patent

UNITED STATES PATENTS

| | | |
|---|---|---|
| 2,114,624 | Bergstein | Apr. 19, 1938 |
| 2,196,666 | Moore | Apr. 9, 1940 |
| 2,533,642 | Vergobbi | Dec. 12, 1950 |
| 2,590,427 | Mackenzie | Mar. 25, 1952 |